No. 889,670. PATENTED JUNE 2, 1908.
R. FAIRCHILD.
VETERINARY PARTURITION INSTRUMENT.
APPLICATION FILED AUG. 6, 1907.
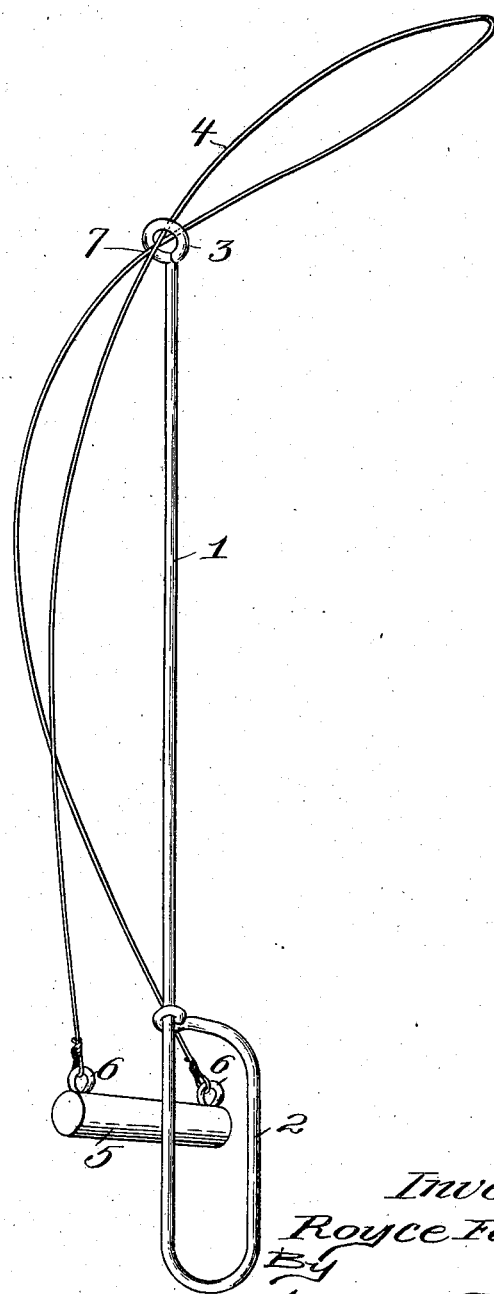

UNITED STATES PATENT OFFICE.

ROYCE FAIRCHILD, OF ONAWA, IOWA.

VETERINARY PARTURITION INSTRUMENT.

No. 889,670.  Specification of Letters Patent.  Patented June 2, 1908.

Application filed August 6, 1907. Serial No. 387,325.

*To all whom it may concern:*

Be it known that I, ROYCE FAIRCHILD, a citizen of the United States, residing at Onawa, in the county of Monona and State of Iowa, have invented new and useful Improvements in Veterinary Parturition Instruments, of which the following is a specification.

This invention relates to veterinary parturition instruments of that type having a yielding loop, and is more especially adapted for aiding sows in giving birth to their young, but capable of use in delivering the young of other animals.

The primary object of the invention is to provide a single loop instrument having means for loosely supporting the loop to permit freedom in the expansion and contraction of the said loop and placement of the latter in various positions within the sow or other animal to meet contingencies that may arise during parturition and the regular or irregular presentation of the young.

The instrument consists essentially of a stem or operating rod having an elongated resilient wire loop freely movable longitudinally through and rotatable in the one extremity of the stem or rod and free to be thrown outwardly from and inwardly towards the rod in opposite lateral directions so as to dispose the loop in various angular positions.

The invention further consists in the details of construction and arrangement of the several parts which will be more fully hereinafter specified.

The drawing illustrates a perspective view of the instrument, and the numeral 1 designates a stem or rod for facilitating the application of the instrument to the animal. This stem or rod is rigid and preferably formed of stiff wire, and has a looped handle 2 at one extremity and an eye 3 at the opposite extremity. The eye 3 is slightly deflected and has a resilient wire loop 4 movably mounted therein and free to be shifted longitudinally in opposite directions to control the expansion and contraction of the loop, and also rotatable in the said eye to readily change its angular position with respect to the stem or rod.

The loop 4 is formed from a piece of resilient wire of suitable length and gage, and which is doubled and the two ends inserted through the eye 3 and then secured to opposite extremities of a loose handle or grip 5 by means of fastening eyes 6, or other analogous devices, located at opposite ends of the said handle or grip 5. Before the ends of the wire loop are secured to the handle, the one member of the loop is crossed over the other, as at 7, to effect a positive movement of the members of the loop projected beyond the eye 3 in expanding or contracting said loop, and also to insure a reliable grasp of the young to be delivered when the loop is drawn taut. By having the ends of the wire loop secured in spaced relation to the handle or grip 5 the wire members of the loop are prevented from twisting during the adjustment of the loop, and in view of the loose assemblage of the loop and the fact that it is held solely by the stem or rod at the eye 3 of the latter, freedom of lateral adjustment of the handle or grip and variation in angular position of the loop is permitted. This simple assemblage of the parts of the instrument is also materially advantageous in economically producing or manufacturing the complete instrument at a comparatively small cost. Another advantage in the structure of the instrument is the deflection of the eye 3 with relation to the stem or rod 1. This deflection or angularity of the eye permits the stem or rod to be held in an easy position and accurately in alinement with the vaginal orifice and insures a ready insertion of the portion of the loop projecting beyond the eye 3 into the vagina.

In using the instrument, the eye 3 of the rod or stem is applied close to the vaginal orifice, and the operator while steadily holding the said rod or stem with one hand then gradually forces the loop into the vaginal canal, that part of the loop which always projects beyond the eye 3 being first inserted for a short distance in the vaginal canal until the said eye reaches the orifice when progressive movement will be imparted to the loop. At times the eye 3 and the forward extremity may be caused to enter the vaginal canal, but this is not essential and will depend on the condition of the animal and the requirements of a particular parturitive operation. As the loop is inserted in the animal it is expanded, and when the limit of insertion is reached, or when a desired or necessary penetration has been obtained, the loop may be turned to any suitable or preferred engaging angle to properly grasp or embrace the young, and an outward pull on the handle or grip 5 while the rod or stem is held stationary, will result in a reliable engagement of the young by the loop and a successful delivery. The use of a single loop is important as it requires less trouble and delay during insertion and minimizes inconvenience to the animal, and will not inflict injury or increase suffering.

Having thus described the invention, what is claimed as new is:—

1. In a veterinary parturition instrument, a rigid supporting means having a single guide device at one end, and a continuous loop of resilient material freely slidable and rotatable in the said single guide device of the supporting means, the loop being freely adjustable in opposite lateral directions with relation to the supporting means.

2. In a veterinary parturition instrument, a supporting means, and a continuous adjustable loop freely rotatable in one end of the supporting means.

3. In a veterinary parturition instrument, a supporting means having a single guide device at one end, a loop loosely carried by and slidable through a single guide device of the said means, and a grip device movable independently of the supporting means and having the terminals of the members of the loop secured thereto in spaced relation.

4. In a veterinary parturition instrument, a supporting means having a single guide device at one end, and a resilient grasping means loosely movable in a single guide device of the said means and having a loop at one extremity and a grip device at the opposite extremity independent of the supporting means.

In testimony whereof I have hereunto set my hand in presence of two subscribing witnesses.

ROYCE FAIRCHILD.

Witnesses:
S. A. HAWARD,
G. W. BUCKLEY.